(12) United States Patent
Kaiser et al.

(10) Patent No.: US 8,903,959 B2
(45) Date of Patent: Dec. 2, 2014

(54) STORAGE NETWORK DATA DISTRIBUTION (71) Applicant: Lyve Minds, Inc., Cupertino, CA (US)

(72) Inventors: Christian M. Kaiser, San Jose, CA (US); Peter D. Stout, San Jose, CA (US); Morgan Francois Stephan Dollard, Belmont, CA (US); Ain McKendrick, Redwood City, CA (US); Timothy Bucher, Geyserville, CA (US); Randeep Singh Gakhal, Cupertino, CA (US); Rick Pasetto, Cupertino, CA (US); Stephen Sewerynek, Cupertino, CA (US)

(73) Assignee: Lyve Minds, Inc., Cupertino, CA (US)

( * ) Notice: Subject to any disclaimer, the term of this patent is extended or adjusted under 35 U.S.C. 154(b) by 0 days.

(21) Appl. No.: 14/137,664

(22) Filed: Dec. 20, 2013

(65) Prior Publication Data

US 2014/0195640 A1    Jul. 10, 2014

Related U.S. Application Data

(60) Provisional application No. 61/750,324, filed on Jan. 8, 2013, provisional application No. 61/750,319, filed on Jan. 8, 2013.

(51) Int. Cl.

| *G06F 15/173* | (2006.01) |
|---|---|
| *G06F 3/06* | (2006.01) |
| *H04L 29/08* | (2006.01) |
| *G06F 12/02* | (2006.01) |
| *G06F 11/00* | (2006.01) |
| *G06F 17/30* | (2006.01) |

(52) U.S. Cl.
CPC .......... *G06F 3/0619* (2013.01); *H04L 67/1097* (2013.01); *G06F 3/0631* (2013.01); *G06F 3/067* (2013.01); *G06F 12/023* (2013.01); *G06F 3/0613* (2013.01); *G06F 3/065* (2013.01); *G06F 11/00* (2013.01); *G06F 17/30174* (2013.01)
USPC ........................................ 709/219

(58) Field of Classification Search
USPC ........................ 709/219, 223, 226
See application file for complete search history.

(56) References Cited

U.S. PATENT DOCUMENTS

| 7,076,622 B2 | 7/2006 | Hsu et al. |
|---|---|---|
| 2002/0161911 A1 | 10/2002 | Pinckney, III et al. |

(Continued)

FOREIGN PATENT DOCUMENTS

KR    10-2008-0065490 A    7/2008

OTHER PUBLICATIONS

International Search Report dated Apr. 30, 2014 as received in Application No. PCT/US2014/010697.

(Continued)

*Primary Examiner* — Ruolei Zong
(74) *Attorney, Agent, or Firm* — Maschoff Brennan (57) ABSTRACT

A method of distributing data through a storage network may include allocating data stored on a host storage block for storage on a target storage block. The host storage block and the target storage block may be included in a storage network that also includes one or more other storage blocks. The method may further include determining a plurality of characteristics of one or more of: the one or more other storage blocks and one or more devices associated with the one or more other storage blocks. Additionally, the method may include determining a distribution strategy for distributing the data from the host storage block to the target storage block based on the plurality of characteristics.

19 Claims, 5 Drawing Sheets

(56) References Cited

U.S. PATENT DOCUMENTS

| | | |
|---|---|---|
| 2003/0229698 A1 | 12/2003 | Furuhashi et al. |
| 2004/0230317 A1* | 11/2004 | Kumar et al. .................... 700/1 |
| 2006/0085428 A1 | 4/2006 | Bozeman et al. |
| 2007/0208748 A1* | 9/2007 | Li .................................. 707/10 |
| 2008/0307094 A1* | 12/2008 | Karonen et al. ............. 709/226 |
| 2009/0265473 A1* | 10/2009 | Hydrie et al. ................ 709/229 |
| 2009/0271485 A1* | 10/2009 | Sawyer et al. ............... 709/206 |
| 2010/0088271 A1 | 4/2010 | Brixius et al. |
| 2010/0115078 A1 | 5/2010 | Ishikawa et al. |
| 2010/0250492 A1 | 9/2010 | Dewey |
| 2010/0274762 A1 | 10/2010 | Murphy et al. |
| 2011/0289366 A1 | 11/2011 | Baptist et al. |
| 2012/0290811 A1 | 11/2012 | Cilibrasi |
| 2014/0195757 A1 | 7/2014 | Kaiser et al. |

OTHER PUBLICATIONS

Written Opinion of the International Searching Authority dated Apr. 30, 2014 as received in Application No. PCT/US2014/010697.
International Search Report and Written Opinion mailed Apr. 30, 2014 in related PCT Application No. PCT/US2014/010694.
Office Action mailed Mar. 26, 2014 in U.S. Appl. No. 14/137,654.
Notice of Allowance mailed Aug. 8, 2014 in U.S. Appl. No. 14/137,654.

* cited by examiner

STORAGE NETWORK DATA DISTRIBUTION

CROSS-REFERENCE TO RELATED APPLICATIONS

This application is based upon and claims the benefit of priority of U.S. Provisional Application No. 61/750,324, filed on Jan. 8, 2013, and of U.S. Provisional Application No. 61/750,319, filed on Jan. 8, 2013. The forgoing applications are incorporated herein by reference in their entirety.

FIELD

The embodiments discussed herein are related to data distribution in a storage network.

BACKGROUND

The amount of personal data (e.g., photos, video, documents, etc.) is increasing such that different methods and systems for storing personal data are also increasing. However, many methods and systems of storing personal data may present challenges such as being cumbersome and time consuming, providing inadequate redundancy, and not allowing for easy accessibility of the data on different devices, among other things.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of distributing data through a storage network may include allocating data stored on a host storage block for storage on a target storage block. The host storage block and the target storage block may be included in a storage network that also includes one or more other storage blocks. The method may further include determining a plurality of characteristics of one or more of: the one or more other storage blocks and one or more devices associated with the one or more other storage blocks. Additionally, the method may include determining a distribution strategy for distributing the data from the host storage block to the target storage block based on the plurality of characteristics.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

As described in further detail below, a storage system may be configured to allocate data among storage blocks included in a storage network, which may be managed by storage agents of the storage network. The storage system may be configured to allocate the data based on the devices associated with the storage agents and specifically based on types of the devices and device characteristics related to the types of the devices. In some embodiments, the allocation may also be based on characteristics of the data that is to be allocated. The allocation of data as described below may help to improve distribution of data among storage blocks. Improving the distribution of the data may help to increase ease of access and redundancy of the data. Alternately or additionally, in some embodiments, the storage system may be configured to determine a distribution strategy for distributing the data to the storage blocks based on one or more device characteristics of the devices included in the storage network. Embodiments of the present disclosure will be explained with reference to the accompanying drawings.

Figure 1A:
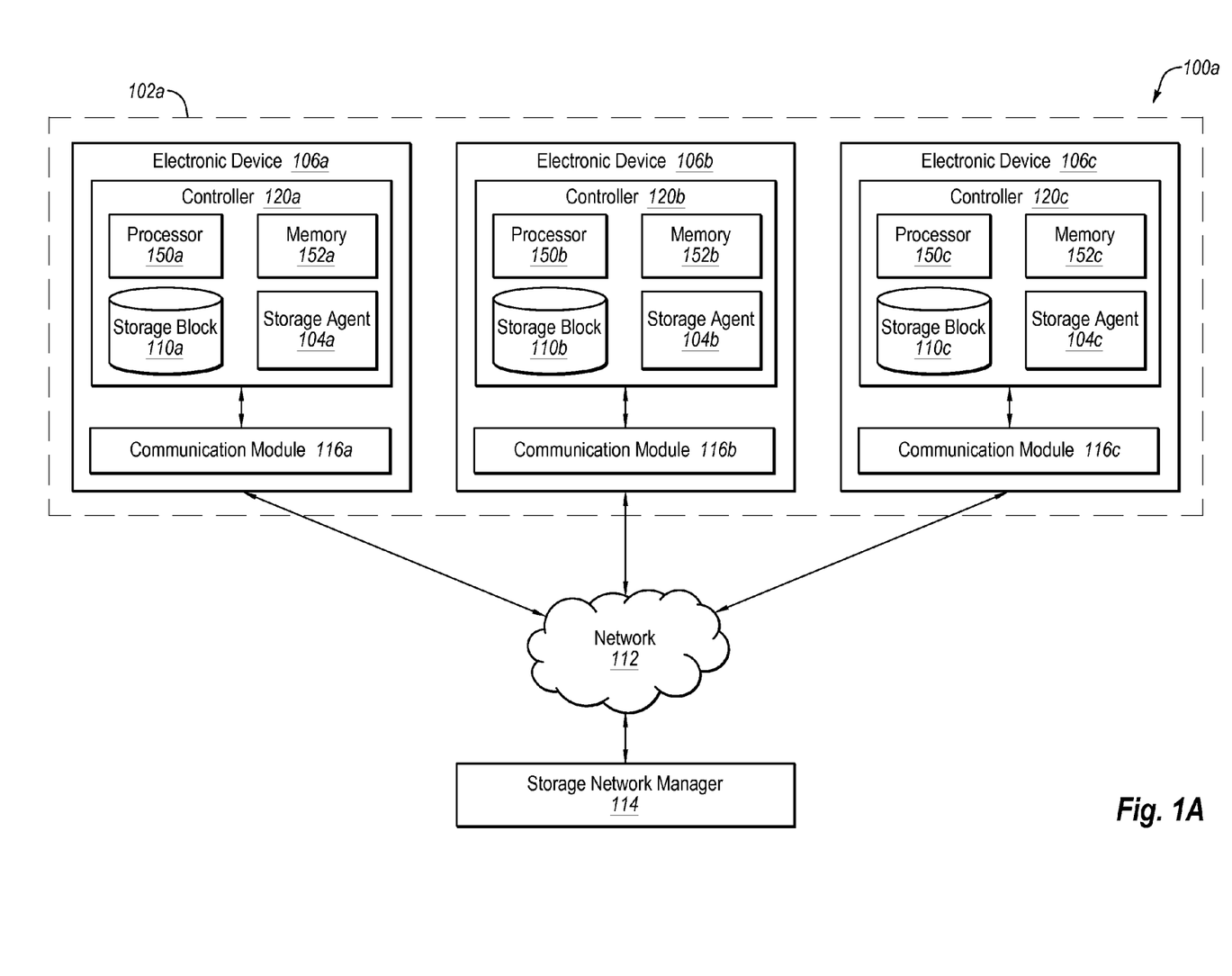
FIG. 1A illustrates an example storage system configured to allocate data to storage blocks included in a storage network.

FIG. 1A illustrates a block diagram of an example storage system 100a configured to allocate data to storage blocks 110 included in a storage network 102a, according to at least one embodiment of the present disclosure. The storage network 102a may include storage blocks 110a-110c, which may be included in electronic devices 106a-106c (also referred to herein as "devices" 106), respectively. The management of storage of the data on the storage blocks 110 may be performed by one or more storage agents 104. In the illustrated embodiment, the storage system 100a is depicted as including storage agents 104a-104c, where the devices 106a-106c respectively include the storage agents 104a-104c. Although the storage system 100a is illustrated as including a single storage network 102a with three different storage blocks 110, storage agents 104 and devices 106 associated therewith, the system 100a may include any number of storage networks that may each include any number of storage blocks 110, storage agents 104, and devices 106. Additionally, one or more of the devices 106 may include more than one storage agent 104 and/or storage block 110, in some embodiments.

In some embodiments, the storage system 100a may be configured to store, organize, and/or manage data files such as photos, videos, documents, etc. In some embodiments, the data files may be included in data objects that may also include metadata that may provide information about the data files. The term "data" in the present disclosure may refer to any suitable information that may be stored by the storage blocks 110 and may include one or more data files, metadata, or any combination thereof.

The storage system 100a may be configured to organize and manage the data stored across the storage blocks 110a-110c in an automated fashion that may reduce an amount of input required by a user. Additionally, the storage system 100a may be configured such that data stored on a particular storage block 110 may be accessed and used by devices 106 that do not include the particular storage block 110. As such, the storage system 100a may facilitate organization of the data stored by the storage blocks 110 and managed by the storage agents 104 within the storage network 102a as well as provide access to the data, regardless of whether the data is stored on a storage block 110 local to a particular device 106.

The devices 106 may be any electronic device that may include one or more storage blocks 110. The devices 106 may be configured to store data to or access data from their associated storage blocks 110. By way of example, the devices 106 may be any one of a cloud storage server, a mobile phone, a tablet computer, a desktop computer, a laptop computer, a camera, a personal digital assistant (PDA), a smartphone, a music player, a video player, an external hard drive, etc.

In some embodiments, the devices 106 may also include a controller 120, which may each include a processor 150, memory 152, and a storage block 110. Additionally, the controllers 120 may each include one or more storage agents 104 that may be configured to manage the storage of data on the storage blocks 110 and the interaction of the devices 106 and storage blocks 110 with the storage network 102. By way of example, in the illustrated embodiment, the device 106a may include a controller 120a that includes a storage agent 104a, a processor 150a, memory 152a, and a storage block 110a; the device 106b may include a controller 120b that includes a storage agent 104b, a processor 150b, memory 152b, and a storage block 110b; and the device 106c may include a controller 120c that includes a storage agent 104c, a processor 150c, memory 152c, and a storage block 110c.

The processors 150 may include, for example, a microprocessor, microcontroller, digital signal processor (DSP), application-specific integrated circuit (ASIC), a Field-Programmable Gate Array (FPGA), or any other digital or analog circuitry configured to interpret and/or to execute program instructions and/or to process data. In some embodiments, the processors 150 may interpret and/or execute program instructions and/or process data stored in their associated memory 152 and/or one or more of the storage blocks 110.

The memories 152 may include any suitable computer-readable media configured to retain program instructions and/or data for a period of time. By way of example, and not limitation, such computer-readable media may include tangible and/or non-transitory computer-readable storage media, including Random Access Memory (RAM), Read-Only Memory (ROM), Electrically Erasable Programmable Read-Only Memory (EEPROM), Compact Disk Read-Only Memory (CD-ROM) or other optical disk storage, magnetic disk storage or other magnetic storage devices, flash memory devices (e.g., solid state memory devices), a specific molecular sequence (e.g., DNA or RNA), or any other storage medium which may be used to carry or store desired program code in the form of computer-executable instructions or data structures and which may be accessed by the processors 150. Combinations of the above may also be included within the scope of computer-readable media. Computer-executable instructions may include, for example, instructions and data that cause a general purpose computer, special purpose computer, or special purpose processing device (e.g., the processors 150) to perform a certain function or group of functions. In some embodiments, the storage agents 104 may be stored as computer-executable instructions inside of the memory 152 of their respective device 106.

The storage blocks 110 may also be any suitable computer-readable medium configured to store data. The storage blocks 110 may store data that may be substantially the same across different storage blocks 110 and may also store data that may only be found on the particular storage block 110. Although each device 106 is depicted as including a single storage block 110, the devices 106 may include any number of storage blocks 110 of any suitable type of computer-readable medium. For example, a device 106 may include a first storage block 110 that is a hard disk drive and a second storage block 110 that is a flash disk drive. Further, a storage block 110 may include more than one type of computer-readable medium. For example, a storage block 110 may include a hard disk drive and a flash drive. Additionally, a storage block 110 may be removable from a device 106 such that it may be included with more than one device 106 at different times. For example, a storage block 110 may be a Universal Serial Bus (USB) storage device or a Secure Digital (SD) card that may be connected to different devices 106 at different times.

As mentioned above, the storage agents 104 may be configured to manage the storage of data on the storage blocks 110 with respect to the storage network 102a. In some embodiments and as indicated above, one or more of the storage agents 104 may be included with any suitable device 106. Additionally, in some embodiments, a device 106 may not include a storage agent 104. In these and other embodiments, one or more storage agents 104 included on one or more other devices 106 may be configured to manage the data on the storage block 110 of the device 106 that may not include a storage agent. For example, in some embodiments, a particular storage block 110 may be included in particular device 106 that is a cloud server managed by a third party. In some of these instances, one or more storage agents 104 of other devices 106 may be configured to manage the storage of data on the particular storage block 110 that is part of the particular device 106.

Additionally, a particular storage block 110 may be a portable storage element such as a USB memory stick that may be coupled with different devices 106 at different times such that different storage agents 104 may manage the particular storage block 110 at different times. For example, in some instances the particular storage block 110 may be coupled to the device 106a at one point in time such that the storage agent 104a may manage the particular storage block 110. Further, at a different time, the particular storage block 110 may be coupled to the device 106b such that the storage agent 104b may manage the particular storage block 110.

The devices 106 may each include a communication module 116 that may provide connectivity between the devices 106 to allow for communication of data between the storage blocks 110 and the storage agents 104. For example, the device 106a may include a communication module 116a, the device 106b may include a communication module 116b, and the device 106c may include a communication module 116c.

The communication modules 116 may provide any suitable form of communication capability between the devices 106. By way of example and not limitation, the communication modules 116 may be configured to provide, via wired and/or wireless mechanisms, Internet connectivity, Local Area Network (LAN) connectivity, Wide Area Network (WAN) connectivity, Bluetooth connectivity, 3G connectivity, 4G connectivity, LTE connectivity, Wireless Fidelity (Wi-Fi) connectivity, Machine-to-Machine (M2M) connectivity, Device-to-Device (D2D) connectivity, any other suitable communication capability, or any suitable combination thereof.

In the illustrated embodiment, the communication modules 116 are depicted as providing connectivity between the devices 106 via a communication network 112 (referred to hereinafter as "network 112"). In some embodiments, the network 112 may include, either alone or in any suitable combination, the Internet, an Intranet, a local Wi-Fi network, a wireless LAN, a mobile network (e.g., a 3G, 4G, and/or LTE network), a LAN, a WAN, or any other suitable communication network. Although not expressly depicted in FIG. 1, in these and other embodiments, the communication modules 116 may provide direct connectivity between the devices 106.

The communication of data stored on the storage blocks 110 between the devices 106 may accordingly allow for the devices 106 to access and use data that may not be stored locally on their associated storage blocks 110. The storage agents 104 may be configured to facilitate such coordination and communication of data between the devices 106. As such, the storage network 102a, the devices 106, the storage agents 104, and the storage blocks 110 may allow for storage of data while also allowing the devices 106 access to the stored data even when the data is not locally stored on the storage blocks 110 included in the particular devices 106. Additionally, the communication of data between the devices 106 and associated coordination by the storage agents 104 may facilitate providing redundancy of the data such that storage blocks may be added to and removed from the storage network 102a with little to no loss of the data in the storage network 102a.

In some embodiments, the devices 106 may act similar to clients or servers included in an object-based file system. For instance, some devices 106 may be configured to store only metadata associated with various data objects, while other devices 106 may be configured to store metadata and actual data files associated with the various data objects.

In some embodiments, to manage and provide information related to the storage of data in the storage network 102a, a catalog of data may be generated and managed for the storage network 102a. For example, in some embodiments, the catalog may include information such as which storage blocks 110 may be locally storing data objects, individual data files, and/or metadata. In some embodiments, the catalog may include a collection of all the metadata of the data objects stored in the storage network 102a. Accordingly, the catalog may be used to determine which storage block 110 has certain data stored thereon. As such, the devices 106 may know from where to access data if the data is not stored locally on their respective storage blocks 110. In some embodiments, the catalog may be stored by and synchronized between each of the storage blocks 110 based on synchronizations that may be managed by the storage agents 104.

In some embodiments, the storage agents 104 may be configured to communicate with one or more storage network controllers that may be referred to individually or collectively as a storage network manager 114. The storage network manager 114 may act similar to a central service in a distributed storage system. The storage network manager 114 may be associated with a server operated by a third-party providing storage management services or may be locally stored on a device 106 owned and/or managed by a user whose data is stored in the storage network 102a.

The storage network manager 114 may perform multiple functions in the storage system 100a, such as coordinating actions of the storage agents 104. For example, the functions of the storage network manager 114 may include, but are not limited to, locating data files among the storage blocks 110 of the storage network 102a, coordinating synchronization of data between the storage blocks 110 as performed by the storage agents 104, allocating storage of data on the storage blocks 110, and coordinating distribution of the data to the storage blocks 110. The allocation and distribution of data between storage blocks 110 is described in further detail below.

In some embodiments, the storage network manager 114 may be included in a device 106 that is local to a user of the storage network 102a and, in other embodiments, the storage network manager 114 may be included in a device 106 that is managed by a third-party. In some embodiments, the storage network manager 114 may perform operations such that the storage network manager 114 may act as and be a storage agent. For example, the storage network manager 114 may manage data such as the catalog and/or other metadata associated with the storage network 102a and may synchronize this data with other storage agents 104 such that the storage network manager 114 may act as a storage agent with respect to such data.

In some embodiments the storage network manager 114 may communicate with the storage agents 104 via the network 112 (as illustrated in FIG. 1A). The storage network manager 114 may also be configured to communicate with one or more of the storage agents 104 via a direct communication (not expressly illustrated in FIG. 1).

Metadata associated with the data included in the storage network 102a (e.g., the catalog described above) may include information regarding the status of the data, which may assist in locating data files, coordinating synchronization of data, allocating the data among the storage blocks 110, and determining a distribution strategy for allocated data, among other things. The status may indicate which data files may be allocated to which storage blocks 110, the distribution strategy associated with the different data files, when a transfer of data between storage blocks 110 has started, that a transfer of data between storage blocks 110 is ongoing, that a transfer of data between storage blocks 110 stopped before the data was completely transferred, and whether particular data is still stored on a storage block 110.

In some embodiments, the storage network manager 114 may communicate instructions to the storage agents 104 regarding storage of the data such as the allocation and distribution of the data with respect to the storage blocks 110. The storage agents 104 may act in response to the instructions communicated from the storage network manager 114 such that the data may be stored on the storage blocks 110 according to the allocation and distribution. Additionally, in some embodiments, metadata communicated to and used by the storage network manager 114 may be such that the storage network manager 114 may know information about the associated data files (e.g., size, type, unique identifiers, location, etc.) stored in the storage network 102a, but may not know information about the actual content of the data files stored in the storage network 102a.

The storage agents 104 may locate data files within the storage network 102a according to metadata that may be stored on each of the storage agents 104. In some embodiments, such metadata may be stored as the catalog described above. For example, the storage agent 104a may locate a data file stored on the storage block 110b using the catalog stored on the storage block 110a and managed by the storage agent 104a. Some or all of the information for the storage agents 104 to locate data files stored on the storage network 102a may be communicated during synchronization of metadata performed by the storage agents 104 and/or a particular storage agent 104 and the storage network manager 114. Additionally or alternatively, the storage agents 104 may communicate with the storage network manager 114 to locate data files stored on the storage network 102a.

Additionally, the storage network manager 114 may communicate with one or more of the storage agents 104 with unreliable, non-existent, or intermittent connectivity with other storage agents 104. As such, the storage network manager 114 may be configured to relay information received from one storage agent 104 to another storage agent 104 to maintain the communication of data between storage agents 104. For example, the storage agent 104c may be communicatively coupled to the storage agent 104b and/or the storage agent 104a using an unreliable or intermittent connection. The storage network manager 114 may accordingly communicate with the storage agent 104c via the communication network 112, and may then relay information from the storage agent 104c to the storage agent 104b and/or the storage agent 104a.

The storage network manager 114 may also be configured to determine a presence of the devices 106 and/or storage blocks 110 within the storage network 102a. The presence of the devices 106 or storage blocks 110 may indicate which devices 106 are communicatively coupled with another device 106 of the storage network 102a and/or with the storage network manager 114, thus indicating which devices 106 and associated storage blocks 110 are "present" within or connected to the storage network 102a. The presence of the devices 106 and their associated storage blocks 110 may indicate the availability of the storage blocks 110 with respect to the storage network, which may be used for data allocation and distribution determinations as detailed below.

As mentioned above, the storage network manager 114 may be configured to determine an allocation of data files for storage on the storage blocks 110. In some embodiments, the storage network manager 114 may be configured to determine the allocation of data files for storage on the storage blocks 110 according to a desired redundancy for the data files and/or a desired availability of the data files. In some embodiments, the storage network manager 114 may determine the allocation to a particular storage block 110 based on multiple characteristics associated with the particular storage block 110. The characteristics may be related to the particular storage block 110 directly (referred to as storage block characteristics) and/or related to the device(s) 106 with which the particular storage block 110 may be associated (referred to as device characteristics).

For example, the storage network manager 114 may determine the allocation based on storage capacity of the particular storage block 110, available storage space of the particular storage block 110, storage element type of the particular storage block 110 (referred to hereinafter as "storage block type"), likelihood of loss of the particular storage block 110, availability of the particular storage block 110 with respect to the storage network 102a, the device 106 with which the particular storage block 110 is associated, health of the storage block, and/or use of the particular storage block 110.

The storage block type may influence one or more other storage block characteristics. For example, a storage block 110 that is a portable and removable storage block, such as a USB memory stick, may have a relatively high likelihood of loss of its data because it may be relatively easy to lose. Additionally, the storage use of a portable and removable storage block may be different than that of a permanently affixed storage block such as a hard disk drive of a desktop computer. Further, a portable and removable storage block may be less available with respect to the storage network 102a because at times it may not be associated with any device 106 such that the data stored thereon may not be available to the devices 106 of the storage network 102a.

Additionally, as detailed below, the particular device 106 with which the particular storage block 110 may be included may influence one or more other characteristics associated with the particular storage block 110 as detailed below. Accordingly, the device characteristics may influence the allocation and distribution of data as described below. In some embodiments, the storage network manager 114 may perform the allocation as the characteristics associated with the storage blocks 110 may relate to the desired redundancy and/or availability of the data files.

Device type is a device characteristic that may influence other characteristics associated with the storage blocks 110 that may influence data allocation. The device types may refer to generic categories of devices as well as specific types or models that may be included in the same generic category. By way of example, in the illustrated embodiment, the device 106a may be a first device type (e.g., a smartphone), the device 106b may be a second device type (e.g., an external hard drive), and the device 106c may be a third device type (e.g., a tablet). The device type may also refer to different models of a more generic device type. For example, a device type may be an iPhone® and another device type may be an Android® phone, even though both may also be characterized generically as smartphones. In some embodiments, the device type may be even more specific such as one device type may be an iPhone® 4 and another device type may be an iPhone® 5.

As indicated above, the types of the devices 106 may relate to one or more device characteristics of the devices 106, which may also be closely related to and/or overlap with storage block characteristics. For example, the device characteristics may include, but are not limited to, storage capacity of their respective storage blocks 110, available storage space of their respective storage blocks 110, removability of their respective storage blocks 110, reliability, likelihood of loss of data stored on their respective storage blocks 110, use of the devices 106 (and consequently of their respective storage blocks 110), physical location of the devices 106, location of the devices 106 with respect to each other, on/off status of the devices 106 (current and/or historical), and health of the devices 106. Additionally, the device characteristics may include the connectivity of the devices 106, such as the bandwidth of their respective connections, the network type (e.g., Wi-Fi, cellular, LAN,) used to connect with other devices 106 as well as the network 112, the connection type (e.g., wireless, wired), connectivity with other devices 106, latency (current and/or historical) of the devices 106 with respect to transfers of data, speed (current and historical) of transfers of data by the devices 106, monetary cost of the connectivity, etc.

As mentioned above, many device characteristics and/or storage block characteristics may relate to the types of the devices 106. For example, some devices 106 may be able to read, write, and/or access data faster than other devices 106 depending on the device type. The device characteristics may be related to a more generic device type (e.g., a smartphone versus a tablet) or a more specific device type (e.g., an iPhone® 4 versus an iPhone® 5).

By way of example, in some embodiments, the device 106a may be a smartphone and the device 106c may be an external hard drive. As a result, the storage capacity of the storage block 110a may be less than the storage capacity of the storage block 110c. Further, in this example, the storage block 110a of the device 106a may include flash memory and the storage block 110c of the device 106c may include a hard disk drive, which may have different levels of reliability as compared to solid state memory. Additionally, the likelihood of loss of the device 106a as a smartphone via the device 106a being lost, left, dropped, stolen, water damaged, etc. may be greater than the likelihood of loss of the device 106c as an external hard drive.

Also, the device 106a as a smartphone may be used by a user to access media type files such as pictures, music, and video, while the device 106c as an external hard drive may be used primarily by the user as a backup of data, but may not be used often to access the data. Accordingly, the use of the devices 106a and 106c and their respective storage blocks 110a and 110c may also be based on the device types of the devices 106a and 106c. Additionally, the device 106a as a smartphone may be carried by the user of the device 106a in a manner that the device 106a (and its associated components such as the storage agent 104a and the storage block 110a) may have inconsistent, low speed, and/or expensive connectivity to other devices 106 (and their associated components) of the storage network 102a. In contrast, the device 106c as an external hard drive (and its associated components) may have more consistent connectivity if the device 106c is constantly connected to at least the network 112.

As another example, the device types may also affect the locations of the devices 106. For example, a desktop computer may be in the same location a lot more often than a smartphone or a tablet is in the same location. Additionally, a desktop computer at a user's home may be likely to come into contact with other devices 106 of the storage network 102a (e.g., smartphones, tablets, etc.) on a fairly consistent basis due to at least many of the other devices 106 likely being in the user's home at one time or another. Accordingly, the device type may also relate to a particular device 106's location with respect to another device 106.

The storage network manager 114 may be configured to determine the storage block characteristics of the storage blocks 110 and may allocate data to the storage blocks 110 based on the storage block characteristics. In some embodiments, the storage network manager 114 may be configured to determine the storage block characteristics based on the devices 106 with which the storage blocks 110 are associated. For example, the storage network manager 114 may be configured to determine the device types of the devices 106 and to determine one or more storage block characteristics and device characteristics based on the device types. Based on the determined characteristics, the storage network manager 114 may allocate data to the associated storage blocks 110.

For example, the device 106a may be a smartphone, which may be determined by the storage network manager 114. The storage network manager 114 may also determine storage block and device characteristics for the device 106a based on the device 106a being a smartphone. For example, the storage network manager 114 may determine storage block and device characteristics that include, but are not limited to, a likelihood of loss of the device 106a and the storage block 110a, reliability of the device 106a, storage capacity of the storage block 110a, available storage space on the storage block 110a, connectivity of the device 106a with the devices 106b and 106c, and use of the device 106a. The storage network manager 114 may accordingly allocate data to the storage block 110a as that data may relate to one or more of the device characteristics of the device 106a and storage block characteristics of the storage block 110a.

For instance, as mentioned above, the likelihood of loss of the device 106a as a smartphone may be relatively high compared to other device types. The storage network manager 114 may accordingly allocate data to the storage block 110a that may also be allocated to other storage blocks 110 associated with other devices 106 such that if the device 106a is lost, the data stored on the storage block 110a may not be lost. Additionally, the storage capacity of the storage block 110a (and thus the device 106a) may be somewhat limited such that the storage network manager 114 may select a subset of the data stored in the storage network 102a to be stored on the storage block 110a of the device 106a, whereas the storage capacity of other storage blocks 110 may be such that they may be able to store all of the data stored in the storage network 102a. Also, because users often use smartphones for viewing pictures and videos, as well as listening to music, in these and other embodiments, the storage network manager 114 may allocate data of this type to be stored on the storage block 110a due to the use of the device 106a and the storage block 110a.

Additionally, due to its nature, the device 106a (and consequently the storage agent 104a) as a smartphone may have sporadic, slow, and/or expensive (e.g., via a cellular network and associated data plan) connectivity with other devices 106 and their associated storage blocks 110 of the storage network 102a. As such, the availability of the storage block 110a and its associated data with respect to the storage network 102a may be somewhat limited. Accordingly, the storage network manager 114 may allocate data to the storage block 110a that may be used more often by the device 106a such that the device 106a may not need to rely on connectivity with other devices 106 and their associated storage blocks 110 to access the data. Further, the storage network manager 114 may not allocate data to the storage block 110 where other devices 106 may rely on accessing the data from the storage block 110a because of the reduced availability of the storage block 110a.

As another example, in some embodiments, the device 106c and the storage block 110c may be associated with a glacial storage system. A glacial storage system may be associated with any type of storage scheme that may have significant latencies (e.g., in the order of minutes or even hours) with respect to storing and/or accessing data stored thereon, but that may be fairly reliable. Many times a glacial storage system may be part of a cloud storage service where the storage blocks of the glacial storage system may be offline (e.g., turned off, stored apart from a computing device) and may need to be placed online before data can be stored thereon or accessed therefrom. The storage network manager 114 may allocate data that may not be accessed often to the storage block 110c associated with a glacial storage system such that the latency may be less of an issue than if the data were accessed more often, which may also free up storage space on storage blocks 110 that may not have such latencies. Additionally, the storage network manager 114 may allocate large portions (if not all) of the data stored in the storage network 102a to the storage block 110c such that the storage block 110c may be used as a backup for data due to the reliable nature of glacial storage systems.

As another example, a particular device 106 may be able to download and/or upload data at a relatively high rate because of the bandwidth of its connections with the network 112 and/or other devices 106. Accordingly, data with a high likelihood of use may be allocated to the storage block 110 associated with the particular device 106 having the high bandwidth connection such that the data may be more easily transferred to and/or accessed by other devices 106 from the particular device 106 and its associated storage block 110.

As another example, a particular device 106 and associated storage block 110 may be configured such that the associated storage block 110 may be removed from the particular device 106. For example, the associated storage block 110 of the particular device 106 may be a removable SD card that may be transferred to another device 106. Due to its removable nature, the removable SD card may have a relatively high likelihood of loss and/or low likelihood of availability with respect to the storage network 102a. Therefore, the storage network manager 114 may allocate data to the storage block 110 that is a removable SD card accordingly. For example, the storage network manager 114 may only allocate data to the storage block 110 that is a removable SD card that is stored on another storage block 110 and/or that is not deemed to be critical if lost.

Location of the devices 106 may also play a role in the allocation of data. For example, a particular device 106 with a device type that is likely to always be in a central location (e.g., a desktop computer in a user's home) may have a high likelihood of being on and reachable such that it have more consistent connectivity with other devices 106. As such, allocation of important data to the storage block 110 of the particular device 106 may be prioritized because of the high likelihood of the storage block 110 being accessible as well as the low likelihood of loss, which may be related to the location of the particular device 106 in some instances.

Health of a storage block 110 and/or device 106 may play a role in the allocation of data in some instances. As a storage block 110 and/or device 106 is used it may wear out such that a health of the storage block 110 and/or the device 106 may diminish over time. In some embodiments, the storage network manager 114 may be configured to monitor the health of the storage blocks 110 and/or devices 106 (e.g., based on use, performance, and/or diagnostic information associated with the storage blocks 110 and the devices 106) and may allocate data accordingly. For example, the storage network manager 114 may not rely on a storage block 110 with diminished health or associated with a device 106 having diminished health for a desired redundancy of data and may therefore discount the contribution of the device 106 with diminished health with respect to the desired redundancy.

In some embodiments, the storage network manager 114 may be configured to monitor the actual use of the devices 106 and/or storage blocks 110 and to adjust the allocation based on the actual use of the devices and/or storage blocks 110, which may be different than initial assumptions that may have been made by the storage network manager 114. In some embodiments, the storage network manager 114 may look for patterns in the use of certain device types such that the storage network manager 114 may vary how it allocates data for similar device types based on the patterns of use. For example, a particular storage block 110 may be portable (e.g., the particular storage block 110 may be an SD card or may be included in a laptop computer) such that initial assumptions about the particular storage block 110 may assume sporadic availability and/or a high likelihood of loss. However, the actual use of the particular storage block 110 (and/or its associated device 106) may be such that the particular storage block 110 is constantly available and/or not transported often. Accordingly, the allocation of data to the particular storage block 110 may be modified based on the actual use of the particular storage block 110.

In some embodiments, the storage agents 104 may also report one or more device and storage block characteristics to the storage network manager 114 such that the storage network manager 114 may allocate data to the storage blocks 110 based on the reported characteristics. For example, the storage agent 104a may report available storage space of the storage block 110a to allow the storage network manager 114 to assess how to allocate data to the storage block 110a. Additionally, in some embodiments, the storage agent 104a may report information to the storage network manager 114 with respect to specific uses of the device 106a and/or storage block 110a such that the storage network manager 114 may allocate data according to the specific uses. In these and other embodiments, the storage network manager 114 may track data that may be stored on storage blocks 110 of the storage network 102a other than the storage block 110a that is frequently being accessed or called for by the device 106a. The storage network manager 114 may, accordingly, allocate that data, and/or data similar to it, to the storage block 110a such that the data may be stored locally on the storage block 110a for faster, more robust access instead of having to be accessed from another storage block 110 associated with another device 106. Therefore, the allocation may increase the likelihood that data accessed by the device 106a is stored locally on the storage block 110a instead of a storage block 110 remote from the device 106a.

In some embodiments, based on the device types and/or device characteristics, the storage network manager 114 may determine a redundancy value for the storage blocks 110, which may be based on the likelihood of being lost. For example, a storage block 110 associated with a smartphone may have a lower redundancy value than a storage block 110 associated with an external hard drive based on the likelihood of loss of a smartphone as compared to an external hard drive. In these or other embodiments, the storage network manager 114 may be configured to determine an availability value for the storage blocks 110 based on the storage block characteristics, device types, and/or device characteristics. The redundancy and/or availability values may be used to weight and/or rank the storage blocks 110 according to the roles they may play in a desired redundancy and/or availability scheme.

The reliability and/or availability of a particular device or 106 or storage block 110 may change over time as indicated by changes in their respective characteristics. The storage network manager 114 may be configured to monitor these changes and may adjust the characteristics of the particular device or 106 or storage block 110 accordingly. In some embodiments, the storage network manager 114 may be configured to adjust allocation of data according to changes in the characteristics.

The storage network manager 114 may also assign data to the storage blocks 110 based on one or more data characteristics of the data itself. The data characteristics may include, but are not limited to, data size, data type, a desired redundancy for the data, frequency of use of the data, a user preference with respect to the data, information included in the data, time of addition of the data to the storage network 102a and/or a storage agent 104, origination of the data, etc.

For example, a data type may be associated with whether or not the data file is a picture file, a video file, an audio file or a document file. In some embodiments, the storage network manager 114 may be configured to allocate data of certain data types to different storage blocks 110 based on the data types. For example, the storage network manager 114 may be configured to allocate audio files to a particular storage block 110 that may act as a repository for audio files.

Additionally, the storage network manager 114 may direct that data with a high frequency of use be allocated to many, and in some instances all, of the storage blocks 110 within the storage network 102a such that the data with high frequency of use may be easily accessed by the associated devices 106. Similarly, in some embodiments, the data may have a desired availability (e.g., based on a predicted frequency of use of the data) associated with it and the storage network manager 114 may allocate the data to the storage blocks 110 based on roles of the storage blocks 110 in achieving the desired availability. For example, the storage network manager 114 may direct that data with a high degree of desired availability be stored on multiple, if not all of, the storage blocks 110 to achieve the high degree of desired availability. As another example, the storage network manager 114 may direct that data with a high degree of desired availability may be stored on a storage block 110 associated with a device 106 that may have relatively consistent connectivity with the network 112 and/or other devices 106 of the storage network 102a. Therefore, the likelihood of that data being available to the devices 106 may be increased.

As indicated above, in some embodiments, the storage network manager 114 may allocate data to storage blocks 110 based on user preferences. For example, a user may "pin" particular data to the storage block 110a to indicate that the user desires that the particular data be stored on the storage block 110a. Based on the "pinning" of the particular data, the storage network manager 114 may accordingly allocate the particular data to the storage block 110a. Other examples of user preferences may include the user explicitly indicating that a certain data type (e.g., videos, photos, music, etc.), recently created data, and/or data originated from a certain device 106, be stored on a particular storage block 110.

In some embodiments, the storage network manager 114 may be configured to allocate data to the storage blocks 110 based on the data characteristics as the data characteristics relate to the device characteristics and/or storage block characteristics. For instance, the storage network manager 114 may look at data size and available storage space on the storage block 110a to determine whether to allocate data of a certain size to the storage block 110a. As another example, the device characteristics of the device 106a may indicate heavy use of music files by the user on the device 106a such that the storage network manager 114 may allocate data having a file type associated with music to the storage block 110a. In these or other embodiments, the storage network manager 114 may look at the desired redundancy of the data and the likelihood of loss and/or reliability of the devices 106 in determining to which and/or to how many storage blocks 110 to allocate the data. Similarly, in some embodiments, the storage network manager 114 may look at the desired availability of the data and the connectivity of the devices 106 in determining to which and/or to how many storage blocks 110 to allocate the data.

As another example, users often access data that is more recently created (newer data) more than data created at an earlier time (older data). Accordingly, the storage network manager 114 may allocate the newer data to the storage blocks 110 associated with devices 106 of types that the user may be likely to access the data more often. In these or other embodiments, the storage network manager 114 may allocate newer data to storage blocks 110 associated with devices 106 that may have a high level of connectivity with the network 112 and/or other devices 106 such that the newer data may be more easily accessed by the devices 106 even if it is not stored on the devices 106.

Conversely, the storage network manager 114 may allocate older data to the storage blocks 110 associated with devices 106 that may store the data for backup purposes, but that may not allow for the data to be as readily accessible. For example, newer data may be allocated to storage blocks 110 associated with devices 106 that may be smartphones, tablets, personal computers, etc., and older data may be allocated to storage blocks 110 associated with devices 106 that may be external hard drives with limited connectivity, cloud storage servers, glacial storage devices, etc.

Further, the storage network manager 114 may be configured to consider the origination of the data during the allocation of the data to the storage blocks 110. For example, the storage network manager 114 may be configured to allocate data created by the device 106a to the storage block 110a because the user may be more likely to desire to access that data on the device 106a based on the data having originated on the device 106a.

In some embodiments, the storage network manager 114 may be configured to rank and allocate the data based on the data characteristics, device characteristics, and/or the storage block characteristics. For example, the storage network manager 114 may be configured to determine an availability rank for data with respect to a desired availability of the data on the devices. The availability rank may be based on one or more of the data characteristics for the data as they may relate to the device and storage block characteristics described above. By way of example, an availability rank of a certain data file with respect to a particular device 106 may be based on, use of the particular device 106 with respect to the type of the certain data file, a user preference of the certain data file or type of the certain data file with respect to the particular device 106, frequency of use of the particular device 106 with respect to the certain data file, origination of the certain data file, when the data was created, etc.

Different storage agent characteristics, device characteristics and data characteristics may be given different weights with respect to how they may relate to the ranking. For example, a user preference with respect to storage of a particular data file on a particular storage block 110 may be given a higher weight than location of the device.

After determining the availability ranking for the data files with respect to the devices 106, the storage network manager 114 may initially allocate the data files to the associated storage blocks 110 of the devices 106 based on the availability rankings for the data files and the available storage space on the storage blocks 110. Following the initial allocation based on the availability rankings, the storage network manager 114 may determine whether the initial allocation satisfies a desired redundancy for the data files. If the desired redundancy is not satisfied, the storage network manager 114 may adjust the allocation such that the desired redundancy is satisfied, which may be at the expense of the desired availability as indicated by the availability rankings.

For example, based on the availability rankings, a data file "A" may be ranked as top priority on the storage block 110a, followed by data files "B," "C," "D," and "E," in that order. For the storage block 110b, the data file "C" may be ranked highest, followed by the data files "E," "B," "A," and "D," in that order. Additionally, for the storage block 110c, the data file "A" may be ranked highest, followed by the data files "C," "E," "D," and "B," in that order.

The storage block 110a may have enough available storage space to store the data files "A," "B," "C," and "D" but not "E." Thus "E" may not be initially allocated to the storage block 110a because it has the lowest rank with respect to the storage block 110a. The storage block 110b may have enough available storage space to store the data files "C," "E," and "B," but not "A" and "D." Thus "A" and "D" may not be initially allocated to the storage block 110b because "A" and "D" are the lowest ranked data files with respect to the storage block 110b. The storage block 110c may have enough available storage space to store the data files "A," "C," and "E," but not "D" and "B." Thus, "D" and "B" may not be initially allocated to the storage block 110c because "D" and "B" are the lowest ranked data files with respect to the storage block 110c.

Following the initial allocation of the data files "A," "B," "C," "D," and "E," the storage network manager 114 may determine whether a desired redundancy for the data files "A," "B," "C," "D," and "E" has been met. In this example, the desired redundancy may be that the data files "A," "B," "C," "D," and "E" are stored on at least two storage blocks 110. However, if the initial allocation of this example were to be followed, data file "D" would only be stored on the storage block 110a. Accordingly, the storage network manager 114 may determine whether a reallocation may be performed to achieve the desired redundancy for the data file "D."

For example, the data file "C" is initially allocated to the storage blocks 110a, 110b, and 110c in the present example.

Therefore, the allocation of the data file "C" to the storage block 110b or the storage block 110c may be replaced by an allocation of the data file "D" to satisfy the desired redundancy of the data file "D." Selection of the storage block 110b or the storage block 110c for storage of the data file "D" may be based on the relative ranking of the data file "D" with respect to the storage blocks 110b and 110c, the available storage space on the storage blocks 110b and 110c, or any other applicable storage block characteristics of the storage blocks 110b and 110c and/or device characteristics of the devices 106b and 106c as they may relate to the desired redundancy of the data file "D."

In some embodiments, the storage network manager 114 may also be configured to designate a particular storage block 110 as a primary repository of data or secondary repository of the data based on one or more of the storage block characteristics of the particular storage block 110, device characteristics of the device 106 associated with the particular storage block 110 and/or based on one or more of the data characteristics. A storage block 110 acting as a primary repository of particular data may be configured to store "primary" copies of the particular data, which may indicate that the storage block 110 acting as a primary repository of the particular data may be relied upon as providing redundancy for the particular data. By contrast, a storage block 110 acting as a secondary repository of particular data may be configured to store "secondary" copies of the particular data, which may indicate that the storage block 110 acting as a secondary repository of the particular data may not be relied upon as providing redundancy for the particular data. A storage block 110 may be configured to store primary copies of some data while also being configured to store secondary copies of other data. Whether or not a storage block 110 acts as a primary or secondary repository for data may depend on the health of the storage block 110 or its associated device 106 in some instances.

The storage agents 104 may also be configured to remove data from the storage blocks 110 and/or the storage network manager 114 may be configured to instruct the storage agents 104 to remove the data based on the storage block characteristics, device characteristics, and/or data characteristics. For example, when the available storage space of a storage block 110 is at or near capacity, the storage block 110 may delete data with a low ranking (e.g., availability ranking) to make space for other data that may have a higher ranking. As another example, in some embodiments, the storage agents 104 may not be able to remove particular data from a certain storage block 110 when the certain storage block 110 is designated as a primary repository for the particular data without express permission from the storage network manager 114 or from the user after the user has been notified of the possible permanent loss of the particular data. In contrast, in some embodiments, storage agents 104 may delete data stored on a particular storage block 110 as secondary copies whenever deemed necessary by the storage agents 104 without permission or instruction from the storage network manager 114. Additionally, in some embodiments, the user may "unpin" data from a particular device 106 and/or storage block 110 such that a priority of maintaining the data on the particular device 106 and/or storage block 110 may be reduced. A reduced priority of maintaining the data on the particular device 106 and/or storage block 110 may allow the unpinned data to be removed from the particular device 106 and/or storage block 110.

In some embodiments, the storage network manager 114 may be configured to determine an overall health of the storage network 102a based on the allocation of data throughout the storage network 102a and the individual devices 106. For example, if data is being stored as primary copies on devices 106 and storage blocks 110 that have a relatively high likelihood of loss and/or a relatively low health rating, the health of the storage network 102a may be considered low as compared to data being stored as primary copies on devices 106 and associated storage blocks 110 that have a relatively low likelihood of loss and/or a relatively high health rating. As another example, the health of the storage network 102a when the storage network 102a does not satisfy a desired redundancy and/or availability for data may be considered low as compared to when the storage network 102a does satisfy a desired redundancy and/or availability for the data.

The storage network manager 114 may be configured to monitor the device types, device characteristics, device health, data characteristics, etc. on a continuous basis and perform allocation in a manner described above based on changes that may be indicated by the monitoring. Accordingly, the storage network manager 114 may be configured to perform dynamic allocation, where the allocation for the storage blocks 110 may change. Additionally, changes associated with one storage block 110 may affect the allocation of data associated with another storage block 110.

For example, in some embodiments, a particular device 106 with a storage block 110 acting as a primary repository for a particular data file may fail such that a desired redundancy for the particular data file may not be satisfied. The storage network manager 114 may accordingly allocate the particular data file to another storage block 110 and may designate the other storage block 110 as a primary repository for the particular data file based on the failure of the particular device 106 and based on the desired redundancy of the particular data file.

As another example, a particular storage block 110 may be associated with a device 106 that may have much more limited connectivity with the storage network 102a than previously. The storage network manager 114 may not rely on the particular storage block 110 as much for redundancy and/or availability and may allocate data stored on the particular storage block 110 accordingly.

Figure 1B:
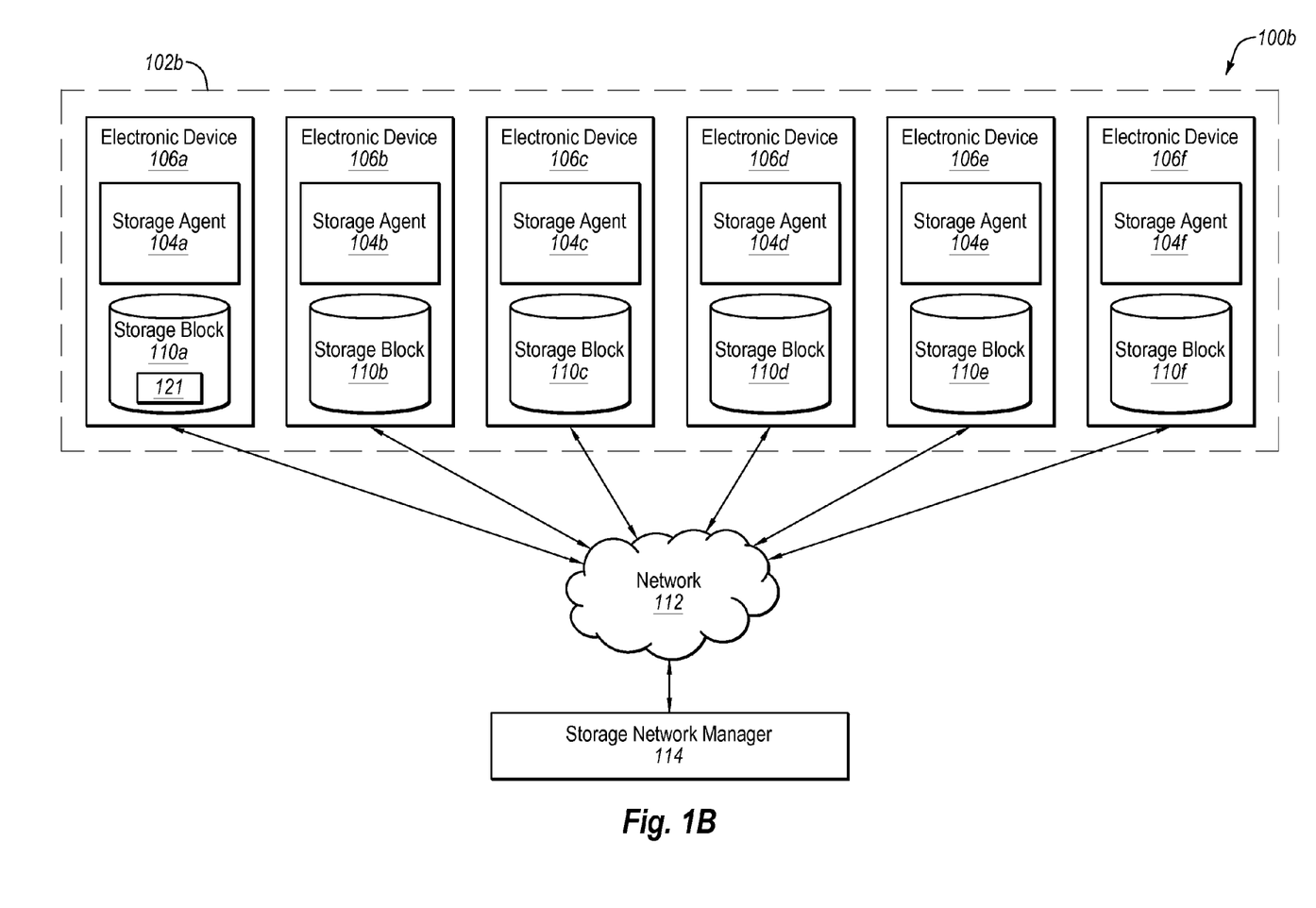
FIG. 1B illustrates an example storage system configured to determine a distribution strategy for distributing data to storage blocks included in a storage network.

As mentioned above, the storage network manager 114 may also be configured to determine a distribution strategy for distributing particular data to the storage blocks 110 to which the particular data has been allocated. FIG. 1B illustrates an example storage system 100b configured to determine a distribution strategy for distributing data to the storage blocks 110, according to at least one embodiment of the present disclosure The storage system 100b may be an expanded example of the storage system 100a of FIG. 1A. For example, the storage system 100b may include the network 112, the storage network manager 114, and the devices 106a-106c with their associated storage agents 104a-104c and storage blocks 110a-110c. However, the storage system 100b may differ from the storage system 100a in that a storage network 102b of the storage system 100b may be depicted with more devices 106 and associated storage agents 104 and storage blocks 110 than the storage network 102a of the storage system 100a. For example, the storage network 102b is depicted as including devices 106d, 106e, and 106f with associated storage agents 104d, 104e, and 104f, respectively, and the storage blocks 110d, 110e, and 110f, respectively, which are not depicted in the storage network 102a of FIG. 1A.

Although, the devices 106a-106f are not depicted in FIG. 1B with all of the elements (e.g., controller, processor, memory, and communication module) as the devices 106a-

106c of FIG. 1A, those elements may be included in the devices 106a-106f and are merely not depicted in FIG. 1B. Additionally, the expansion of the storage network 102b with respect to the storage network 102a is to facilitate describing the determination of the distribution strategy and is not limited to storage networks having only the same number of devices 106 and storage agents 104 as the storage network 102b.

The storage network manager 114 may be configured to determine distribution strategies for distributing the allocated data to the storage blocks 110 based on the characteristics of the storage blocks 110, the devices 106 and/or the data characteristics of the data allocated to the storage blocks 110. In these or other embodiments, the storage network manager 114 may be configured to determine a distribution strategy for particular data based on the data characteristics and/or allocation of other data as well as the different storage blocks 110 to which the particular data may be allocated.

For example, in some embodiments, the storage block 110a may have data 121 stored thereon that has been allocated for storage on the storage block 110f such that the storage block 110a may be a host storage block and the storage block 110f may be a target storage block with respect to the data 121. The storage network manager 114 may be configured to determine a distribution strategy for distributing the data 121 from the storage block 110a to the storage block 110f based on one or more characteristics associated with the devices 106a-106f and/or storage blocks 110a-110f. In these or other embodiments, one or more other storage blocks 110 may be host storage blocks or target storage blocks of the data 121. Once the distribution strategy has been determined, one or more of the storage agents 104 may be configured to execute the distribution strategy.

In some embodiments, a characteristic that may be used by the storage network manager 114 for determining the distribution strategy may be connectivity of the devices 106a-106f with respect to the storage network 102b (e.g., the connectivity of the devices 106a-106f with respect to each other). For example, the devices 106a and 106f may not be able to communicate with each other, but the device 106b may be able to communicate with both the devices 106a and 106f. A situation like this may occur, by way of example, when the devices 106a and 106b are both connected (e.g., through a wireless or wired connection) to the network 112 and the device 106f is not connected to the network 112 but is connected to the device 106b. In instances such as these, the storage network manager 114 may be configured to determine a distribution strategy from the storage block 110a to the storage block 110f where the storage agent 104a may relay the data 121 or a copy of the data 121 to the storage agent 104b, which may then relay the data 121 to the storage agent 104f, which may direct that the data 121 be stored in the storage block 110f.

Another characteristic that may be used by the storage network manager 114 for determining the distribution strategy may be the types of connections of the devices 106a-106f with each other. For example, the devices 106a and 106f may be connected to each other via the network 112. Additionally, the device 106a may be connected to the network 112 through a non-cellular wireless Internet connection (e.g., Wi-Fi) while the device 106f may be connected to the network 112 via a cellular network connection. Therefore, distributing the data 121 from the storage block 110a of the device 106a to the storage block 110f of the device 106f via the network 112 may use data in an associated cellular data plan, which may have a higher cost than if a non-cellular connection were used. However, the device 106b may be directly connected to the device 106f and may also be connected to the network 112 via a non-cellular wireless Internet connection. Accordingly, in some embodiments, the storage network manager 114 may determine a distribution strategy where the data 121 is relayed by the storage agent 104a from the storage block 110a to the storage agent 104b and then from the storage agent 104b to the storage agent 104f for storage on the storage block 110f. Therefore, the cost of the transfer may be less than if a transfer from the device 106a to the device 106f via the network 112 were used. As another example, the storage network manager 114 may determine a similar distribution strategy in instances where the devices 106a and 106f may be connected to each other and the device 106b (e.g., directly or via the network 112), but the bandwidths of their respective connections with the device 106b may be higher than the bandwidth of the connection between the devices 106a and 106f.

Another device characteristic used by the storage network manager 114 for determining the distribution strategy may be the frequency of connections of the devices 106a-106f. For example, the device 106e may be connected to the device 106f more often than the device 106e is connected to the device 106a. In these and other embodiments, when the device 106f is not connected to any other device 106 of the storage network 102b that is also connected to the device 106a, but the devices 106a and 106e are connected to each other, the storage network manager 114 may determine a distribution strategy where the storage agent 104a may distribute the data 121 to the storage agent 104e. The distribution strategy may then direct the storage agent 104e to distribute the data 121 to the storage agent 104f when the devices 106e and 106f are connected, which may be likely to occur sooner than the device 106a being connected to the device 106f.

In some embodiments, the frequency and/or quality of connections between the devices 106 may be related to how often the devices 106 are in the same vicinity with each other. Accordingly, in some embodiments, the storage network manager 114 may also consider the locations of the devices 106 with respect to each other as a device characteristic when determining the distribution strategy.

In some embodiments, the distribution strategy may be based on a characteristic such as general connectivity of the devices 106 as well as redundancy or availability provided by the devices 106 and their corresponding storage blocks 110. For example, the storage block 110a may have other data than just the data 121 stored thereon and the other data may be allocated for storage on other storage blocks 110. Additionally, the amount of data that may be distributed from the storage block 110a by the storage agent 104a to other storage agents 104 and storage blocks 110 may be limited at any one time due to the connectivity (e.g., due to its bandwidth) of the device 106a with the storage network 102b. Accordingly, in some embodiments, the storage network manager 114 may determine a distribution strategy of the data 121 and the other data stored on the storage block 110a according to an assigned rank of the storage block 110f with respect to the data 121 as compared to an assigned rank of another target storage block with respect to the other data stored on the storage block 110a.

By way of example, the other data stored on the storage block 110a may be allocated for the storage block 110b and the data 121 stored on the storage block 110a may be allocated for the storage block 110f. Additionally, due to connectivity limitations, the storage agent 104a may not be able to transfer the other data to the storage agent 104b and storage block 110b at the while also transferring the data 121 to the storage agent 104f and storage block 110f at the same time. Further, the other data may have a higher rank for storage on the storage block 110b than the data 121 may have for storage on the storage block 110*f*. Accordingly, the distribution strategy may call for distribution of the other data to the storage block 110*b* before distribution of the data 121 to the storage block 110*f*.

The storage network manager 114 may also determine the distribution strategy based on the allocation of data on other devices as well as the above listed device and storage block characteristics. For example, the storage block 110*a* may have a relatively large amount of data, including the data 121, stored thereon that has been allocated for a large number of target storage blocks. Additionally, the storage block 110*d* may have a relatively small amount of data, including the data 121 (not expressly depicted as being stored on the storage block 110*d*), stored thereon that has been allocated for a relatively small number of target storage blocks. Accordingly, the storage network manager 114 may determine a distribution strategy where the data 121 may be distributed from the storage block 110*d* to the storage block 110*f* instead of from the storage block 110*a* such that the storage agent 104*a* may distribute the other data stored on the storage block 110*a* without having to also distribute the data 121.

Similarly, in some embodiments, the data 121 may be allocated to the storage block 110*e* and the storage block 110*f* as target storage blocks, but may initially only be stored on the storage block 110*a*. Additionally, the storage block 110*a* may have a relatively large amount of data stored thereon that has been allocated for a relatively large number of target storage blocks. Accordingly, the storage network manager 114 may determine a distribution strategy where the data 121 may be distributed from the storage block 110*a* to the storage agent 104*e* (which may store the data 121 on storage block 110*e*) and then from the storage agent 104*e* to the storage agent 104*f* (which may store the data 121 on the storage block 110*f*) or from the storage block 110*a* to the storage agent 104*f* (which may store the data 121 on the storage block 110*f*) and then from the storage agent 104*f* to the storage agent 104*e* (which may store the data 121 on the storage block 110*e*). Therefore, the storage agent 104*a* may distribute other data to other storage blocks after distributing the data 121 once instead of having to distribute the data 121 multiple times before moving on to distributing the other data.

Moreover, the storage network manager 114 may be configured to determine the distribution strategy based on a power status of the devices 106. The power status may indicate whether a particular device 106 is plugged in or running on battery power. Additionally, the power status may indicate how much charge may be remaining in the battery. In some embodiments, the storage network manager 114 may determine a distribution strategy where devices 106 that are plugged in are prioritized as transferring data over those that are running on battery power to help conserve the battery power. Further, in these or other embodiments, devices 106 with more battery life than other devices 106 may also be prioritized for transferring data over the other devices with less battery life.

The storage network manager 114 may also determine the distribution strategy based on the data characteristics of the data that is to be distributed. For example, the storage network manager 114 may determine that a certain data type may have a higher distribution priority than another data type. Accordingly, the storage network manager 114 may develop a distribution strategy such that data that is of a higher priority data type is distributed to target storage blocks before data of a lower priority data type.

As another example, the storage network manager 114 may develop a distribution strategy where data with a higher desired redundancy and/or accessibility may be distributed to its target storage blocks before data with a lower desired redundancy and/or accessibility. For example, the storage network manager 114 may prioritize the distribution of data files that are to be stored as primary copies on target storage blocks over the distribution of data files that may be stored as secondary copies on their target storage blocks.

Further, in some embodiments, the storage network manager 114 may determine the distribution strategy based on the device characteristics and how they may relate to the data characteristics. For example, in some embodiments, the data 121 may be allocated for storage as a primary copy on the storage agents 104*e* and 104*f*. Additionally, the device 106*e* may be a smartphone and the device 106*f* may be a desktop computer. Accordingly, the storage network manager 114 may determine a distribution strategy where the data 121 is prioritized for distribution to the storage block 110*f* over distribution to the storage block 110*e* because the device 106*f* may be more reliable than the device 106*e*.

As another example, the data 121 may be a music file allocated for the storage blocks 110*e* and 110*f*. The storage network manager 114 may observe that the device 106*e* may have accessed music much more often than the device 106*f*. Accordingly, in some embodiments, the storage network manager 114 may determine the distribution strategy based on the data type (e.g., music file) and device use (e.g., access music often) such that distribution of the data 121 to the storage block 110*e* is prioritized over distribution to the storage block 110*f* because of the high use of the device 106*e* for listening to music as compared to the device 106*f*.

Additionally, in some embodiments, the storage network manager 114 may determine the distribution strategy based on user preferences. For example, in some embodiments, the user may indicate a desire that the data 121 be stored on the storage block 110*f*. The storage network manager 114 may therefore develop a distribution strategy that prioritizes distributing the data 121 to the storage block 110*f* over other storage blocks 110 that may also be target storage blocks for the data 121.

Further, in some embodiments, the storage network manager 114 may determine the distribution strategy for the data 121 based on the size of the data 121. For example, when the data 121 is relatively large and would use a relatively large amount of bandwidth, the storage network manager 114 may determine a distribution strategy for the data 121 that schedules the distribution of the data 121 at a time where there may be relatively low use of communication resources, such as late at night.

In these or other embodiments, the storage network manager 114 may determine the distribution strategy based on the time when the data 121 is added to the storage network 102*b*. For example, when the data 121 is relatively new data, the data 121 may be more likely to be accessed than when the data 121 is relatively older data. Accordingly, the distribution strategy may prioritize distribution of the data 121 over older data but not over newer data.

Modifications, additions, or omissions may be made to the storage systems 100*a* and 100*b* without departing from the scope of the present disclosure. For example, the storage systems 100*a* and 100*b* may include any number of devices 106, storage blocks 110, and/or storage agents 104. Further, the locations of components within the devices 106 are for illustrative purposes only and is not limiting. Additionally, although the allocation and distribution of data is described as being performed by the storage network manager 114 with respect to the storage networks 102*a* and 102*b*, the principles and teachings associated with the allocation and/or distribution of data may be applied in and by any suitable element of any applicable storage network and/or storage system.

Figure 2:
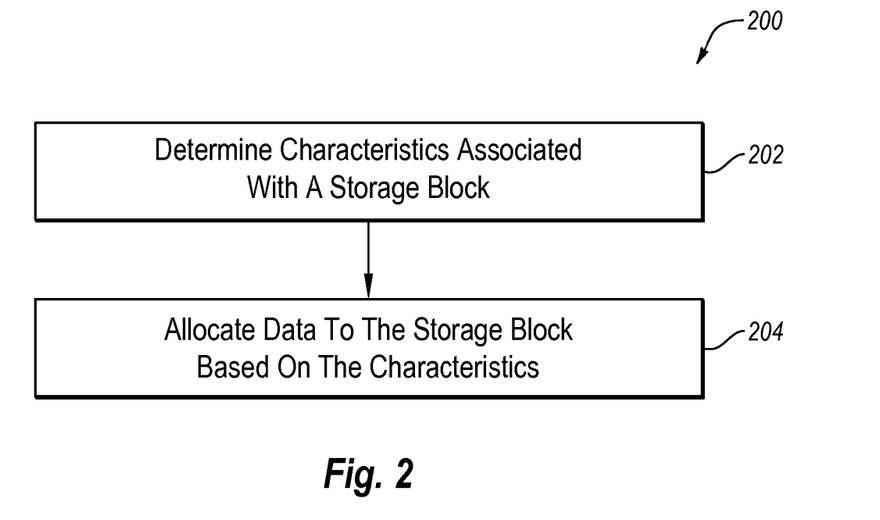
FIG. 2 is a flowchart of an example method of allocating data to a storage block of a storage network.

FIG. 2 is a flowchart of an example method 200 of allocating data to a storage block of a storage network, according to at least one embodiment described herein. One or more steps of the method 200 may be implemented, in some embodiments, by one or more components of the storage systems 100a and/or 100b of FIGS. 1A and 1B, such as the storage network manager 114, the storage agents 104, or the devices 106. Although illustrated as discrete blocks, various blocks may be divided into additional blocks, combined into fewer blocks, or eliminated, depending on the desired implementation.

The method 200 may begin at block 202, where a plurality of characteristics associated with a storage block included in a storage network may be determined. The plurality of characteristics may include storage capacity of the storage block, available storage space of the storage block, likelihood of loss of data stored on the storage block, availability of the storage block with respect to the storage network, and use of the storage block.

At block 204, data may be allocated to the storage block based on the plurality of characteristics. In some embodiments, the allocation may be further based on a type of the storage block, a health of the storage block, a device type of a device associated with the storage block, use of the device, a likelihood of loss of the device, a health of the device, a location of the device, connectivity of the device with the storage network, a cost of connectivity of the device with the storage network, and a reliability of the device.

Accordingly, the method 200 may be performed to allocate data to one or more storage blocks of a storage network based on characteristics associated with the storage blocks. Allocation of data in this manner may provide for an improved user experience and redundancy within the storage network over existing data storage schemes.

One skilled in the art will appreciate that, for the method 200 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 200 may include further steps associated with determining a desired redundancy of the data and determining a redundancy role of the storage block for the data based on the plurality of characteristics. In these and other embodiments, the method 200 may further include allocating the data to the storage block based on the redundancy role of the storage agent.

Further, the method 200 may include steps associated with assigning the storage agent as a primary repository or a secondary repository of the data based on the plurality of characteristics. The method 200 may also include steps associated with allocating the data for storage on the storage block based on a data characteristic of the data. The data characteristic may include any one or more of data type, frequency of use of the data, desired redundancy for the data, size of the data, a ranking of the data, information included in the data, a user preference with respect to the data, time of addition of the data to the storage network and/or a storage agent, origination of the data, etc. In some embodiments, the allocation may be based on how the data characteristic relates to one or more of the plurality of characteristics.

Figure 3:
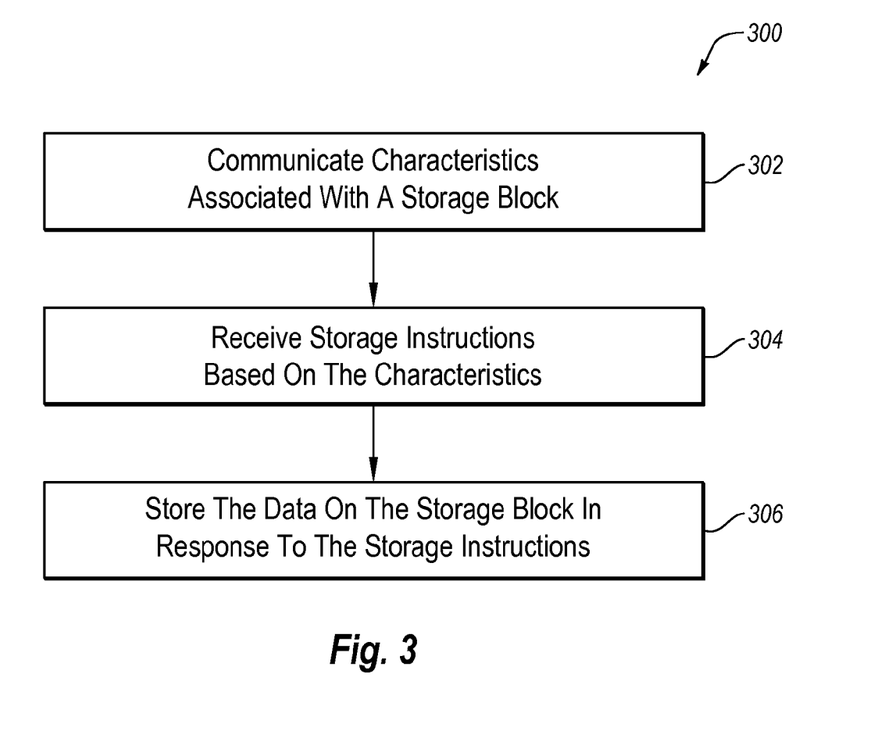
FIG. 3 is a flowchart of an example method of storing data on a storage block of a storage network.

FIG. 3 is a flowchart of an example method 300 of storing data on a storage block of a storage network, according to at least one embodiment described herein. One or more steps of the method 300 may be implemented, in some embodiments, by one or more components of the storage systems 100a and/or 100b of FIGS. 1A and 1B, such as the storage network manager 114, the storage agents 104, or the devices 106. Although illustrated as discrete blocks, various blocks may be divided into additional blocks, combined into fewer blocks, or eliminated, depending on the desired implementation.

The method 300 may begin at block 302, where a plurality of characteristics associated with a storage block included in a storage network may be communicated to a storage network manager such as the storage network manager 114 of FIGS. 1A and 1B. The plurality of characteristics may include storage capacity of the storage block, available storage space of the storage block, likelihood of loss of data stored on the storage block, availability of the storage block with respect to the storage network, and use of the storage block At block 304, a storage instruction for storing data on the storage block may be received from the storage network controller. The storage command may be based on the plurality of characteristics. At block 306, the data may be stored on the storage block in response to the storage instruction.

Accordingly, the method 300 may be performed to store data on a storage block of a storage network based on characteristics associated with the storage blocks and their associated devices. Allocation of data in this manner may provide for an improved user experience and redundancy within the storage network over existing data storage schemes.

One skilled in the art will appreciate that, for the method 300 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 300 may include steps associated with storing the data on the storage block based on a data characteristic of the data. The data characteristic may include any one or more of data type, frequency of use of the data, desired redundancy for the data, size of the data, a ranking of the data, information included in the data, a user preference with respect to the data, time of addition of the data to the storage network, and/or a storage agent, origination of the data, etc.

Figure 4:
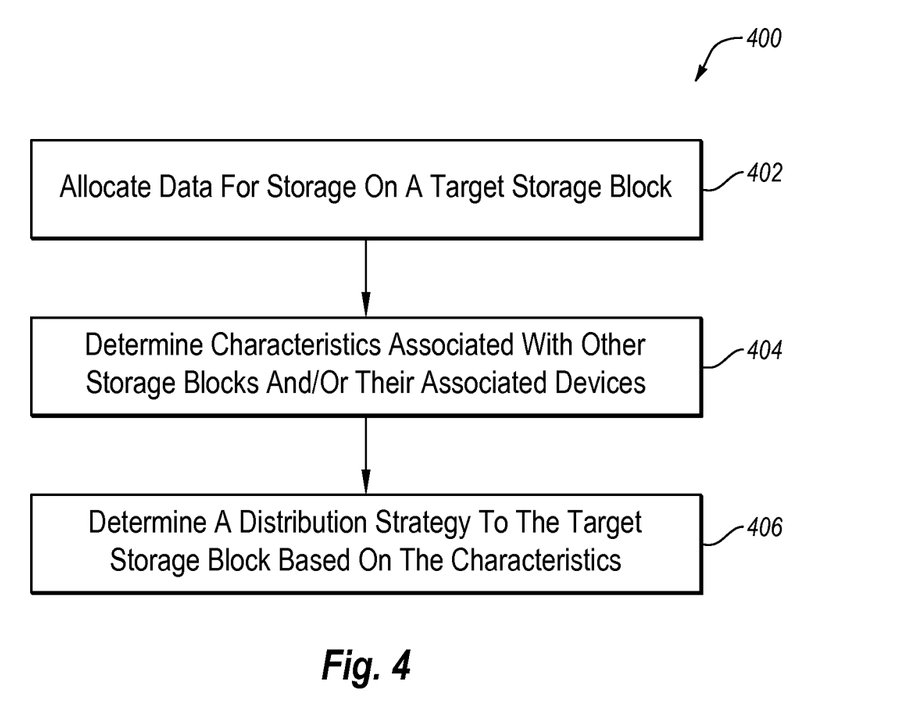
FIG. 4 is a flowchart of an example method of determining a distribution strategy for distributing data to storage blocks of a storage network.

FIG. 4 is a flowchart of an example method 400 of determining a distribution strategy for distributing data to storage blocks of a storage network, according to at least one embodiment described herein. One or more steps of the method 400 may be implemented, in some embodiments, by one or more components of the storage systems 100a and/or 100b of FIGS. 1A and 1B, such as the storage network manager 114, the storage agents 104, and/or the storage devices 106. Although illustrated as discrete blocks, various blocks may be divided into additional blocks, combined into fewer blocks, or eliminated, depending on the desired implementation.

The method 400 may begin at block 402, where data stored on a host storage block may be allocated for storage on a target storage block. The host storage block and the target storage block may be included in a storage network that also includes one or more other storage blocks, such as the storage networks 102a and 102b of FIGS. 1A and 1B. In some embodiments, the allocation may be performed according to the allocation described above. For example, in some embodiments, the allocation may be performed based on a plurality of characteristics associated with the target storage block where the plurality of characteristics may include storage capacity of the storage block, available storage space of the storage block, likelihood of loss of data stored on the storage block, availability of the storage block with respect to the storage network, and use of the storage block. In these or other embodiments, the allocation may be made based on a data characteristic of the data.

At block 404, characteristics of the other storage agents and/or one or more devices associated with the e other storage agents may be determined. The characteristics may include connectivity of the one or more devices with the storage network, a power status of the one or more devices, use of the devices, and locations of the one or more device. As mentioned above, the connectivity of the devices may include cost of the connectivity, frequency of the connectivity, bandwidth of the connectivity, and type of connection.

At block 406, a distribution strategy for distributing the data from the host storage block to the target storage block may be determined based on the characteristics determined at block 404. In some embodiments, the distribution strategy may be based on a rank of the target storage block with respect to the data. In these or other embodiments, the distribution strategy may be determined based on the allocation of the data to other storage blocks and/or the allocation of other data stored on the host storage block.

Additionally, in some embodiments, the distribution strategy may be determined based on one or more data characteristics of the data such as data type, a desired redundancy of the data, a desired availability of the data, size of the data, time of addition of the data to the storage network, and a user preference associated with the data. In these or other embodiments, the distribution strategy may be determined based on how the data characteristics may relate to the characteristics associated with the other storage blocks, the target storage block, and/or the host storage block.

Accordingly, the method 400 may be performed to determine a distribution strategy for data. Distribution of data in this manner may provide for an improved user experience and redundancy within a storage network over existing data storage schemes.

One skilled in the art will appreciate that, for the method 400 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

As described above, the embodiments described herein may include the use of a special purpose or general purpose computer (e.g., the processors 150 of FIG. 1) including various computer hardware or software modules, as discussed in greater detail below. The special purpose or general purpose computer may be configured to execute computer-executable instructions stored on computer-readable media (e.g., the memories 152 and/or storage blocks 110 of FIG. 1).

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the present disclosure.

What is claimed is:

1. A method comprising:
   allocating data stored on a host storage block for storage on a target storage block based on a plurality of target block characteristics associated with the target storage block, the host storage block and the target storage block being included in a storage network that also includes one or more other storage blocks different from the host storage block and the target storage block, the plurality of target block characteristics including storage capacity of the target storage block, available storage space of the target storage block, likelihood of loss of the data associated with the data being stored on the target storage block, frequency of availability of the target storage block with respect to the storage network, and observed use of the target storage block with respect to other data;
   determining a plurality of other-characteristics of one or more of: the one or more other storage blocks and one or more other devices associated with the one or more other storage blocks; and
   determining a distribution strategy that indicates how to distribute the data from the host storage block to the target storage block based on the plurality of other-characteristics.

2. The method of claim 1, wherein the plurality of other-characteristics include one or more of: connectivity of the one or more other devices with the storage network, a power status of the one or more other devices, use of the one or more other devices, and locations of the one or more other devices.

3. The method of claim 2, wherein the connectivity of the one or more other devices includes one or more of: cost of the connectivity, frequency of the connectivity, bandwidth of the connectivity, and type of connection.

4. The method of claim 1, further comprising determining the distribution strategy based on a rank of a target device associated with the target storage block with respect to the data.

5. The method of claim 1, further comprising determining the distribution strategy based on one or more of: allocation of the data to the one or more other storage blocks and allocation of other data stored on the host storage block.

6. The method of claim 1, further comprising determining the distribution strategy based on one or more data characteristics of the data.

7. The method of claim 6 further comprising determining the distribution strategy based on how the one or more data characteristics relate to one or more of the plurality of other-characteristics.

8. The method of claim 6, wherein the one or more data characteristics include one or more of: data type, a desired redundancy of the data, a desired availability of the data, size of the data, time of addition of the data to the storage network, and a user preference associated with the data.

9. The method of claim 1, further comprising allocating the data to the target storage block based on a data characteristic of the data.

10. A non-transitory computer-readable storage medium including instructions that cause a system to perform operations, the operations comprising:
  allocating data stored on a host storage block for storage on a target storage block based on a plurality of target block characteristics associated with the target storage block, the host storage block and the target storage block being included in a storage network that also includes one or more other storage blocks different from the host storage block and the target storage block, the plurality of target block characteristics including storage capacity of the target storage block, available storage space of the target storage block, likelihood of loss of the data associated with the data being stored on the target storage block, frequency of availability of the target storage block with respect to the storage network, and observed use of the target storage block with respect to other data;
  determining a plurality of other-characteristics of one or more of: the one or more other storage blocks and one or more other devices associated with the one or more other storage blocks; and
  determining a distribution strategy that indicates how to distribute the data from the host storage block to the target storage block based on the plurality of other-characteristics.

11. The non-transitory computer-readable storage medium of claim 10, wherein the plurality of other-characteristics include one or more of: connectivity of the one or more other devices with the storage network, a power status of the one or more other devices, use of the one or more other devices, and locations of the one or more other devices.

12. The non-transitory computer-readable storage medium of claim 11, wherein the connectivity of the one or more other devices includes one or more of: cost of the connectivity, frequency of the connectivity, bandwidth of the connectivity, and type of connection.

13. The non-transitory computer-readable storage medium of claim 10, wherein the operations further comprise determining the distribution strategy based on a rank of a target device associated with the target storage block with respect to the data.

14. The non-transitory computer-readable storage medium of claim 10, wherein the operations further comprise determining the distribution strategy based on one or more of: allocation of the data to the one or more other storage blocks and allocation of other data stored on the host storage block.

15. The non-transitory computer-readable storage medium of claim 10, wherein the operations further comprise determining the distribution strategy based on one or more data characteristics of the data.

16. The non-transitory computer-readable storage medium of claim 15, wherein the operations further comprise determining the distribution strategy based on how the one or more data characteristics relate to one or more of the plurality of other-characteristics.

17. The non-transitory computer-readable storage medium of claim 15, wherein the one or more data characteristics include one or more of: data type, a desired redundancy of the data, a desired availability of the data, size of the data, time of addition of the data to the storage network, and a user preference associated with the data.

18. The non-transitory computer-readable storage medium of claim 10, wherein the operations further comprise allocating the data to the target storage block based on a data characteristic of the data.

19. A system comprising:
  a processor; and
  a computer-readable storage medium including instructions that cause the processor to perform operations, the operations comprising:
    allocating data stored on a host storage block for storage on a target storage block, the host storage block and the target storage block being included in a storage network that also includes one or more other storage blocks different from the host storage block and the target storage block;
    determining a plurality of other-characteristics of one or more of: the one or more other storage blocks and one or more other devices associated with the one or more other storage blocks; and
    determining a distribution strategy that indicates how to distribute the data from the host storage block to the target storage block based on the plurality of other-characteristics, allocation of the data to the one or more other storage blocks, allocation of other data stored on the host storage block, one or more data characteristics of the data and the other data, and how the one or more data characteristics relate to one or more of the plurality of other-characteristics, the one or more data characteristics including data type, a desired redundancy of the data, a desired availability of the data, size of the data, time of addition of the data to the storage network, and a user preference associated with the data.

* * * * *